No. 854,721. PATENTED MAY 28, 1907.
M. W. DAY.
MOTOR CONTROL.
APPLICATION FILED OCT. 15, 1906.
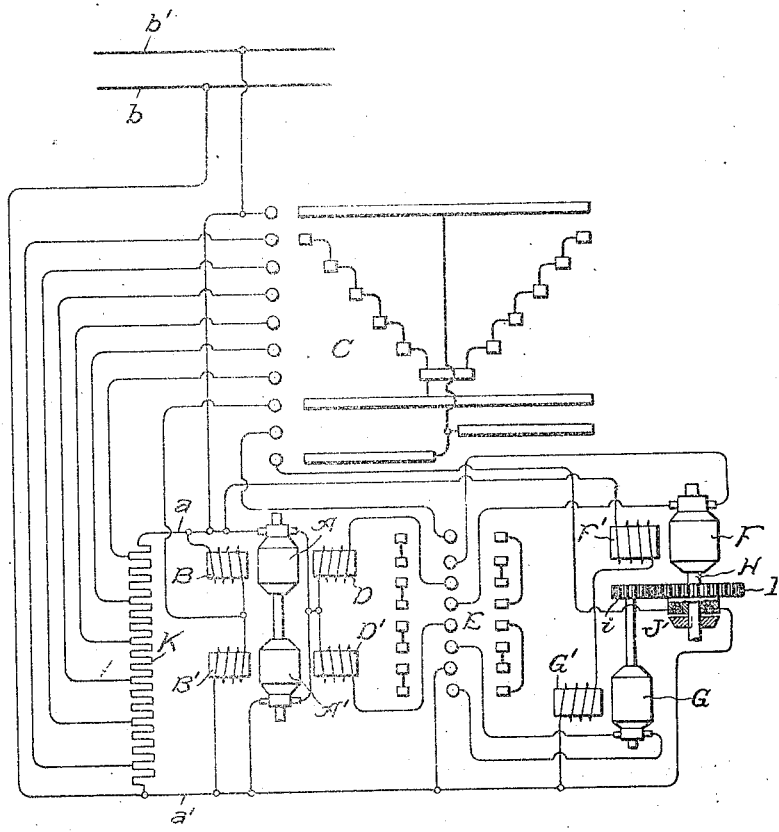
Witnesses:
Marcus L. Byng.
Helen Orford
Inventor:
Maxwell W. Day,
by Albert G. Davis
Att'y.

UNITED STATES PATENT OFFICE.

MAXWELL W. DAY, OF SCHENECTADY, NEW YORK, ASSIGNOR TO GENERAL ELECTRIC COMPANY, A CORPORATION OF NEW YORK.

MOTOR CONTROL.

No. 854,721.  Specification of Letters Patent.  Patented May 28, 1907.

Application filed October 15, 1906. Serial No. 338,891.

*To all whom it may concern:*

Be it known that I, MAXWELL W. DAY, a citizen of the United States, residing at Schenectady, county of Schenectady, State of New York, have invented certain new and useful Improvements in Motor Control, of which the following is a specification.

My invention relates to the control of electric motors for driving loads over wide ranges of speed.

For certain kinds of motor drivers, in which wide ranges of speed are required, such as in the operation of gun turrets and printing presses, it has been proposed heretofore to employ two motors, the smaller of which is geared to the load through speed-reducing gearing so as to start and drive it at low speed, while the larger motor is geared so as to drive the load at high speed. The smaller motor is ordinarily provided with a clutch so that it can be disconnected from the load when the larger motor is operating. The method of speed control that has usually been employed heretofore for such a combination, is the resistance method but in cases where a constant speed is desired for any given position of the controlling switch with varying load, resistance control is not suitable, since the voltage drop in the resistance varies with varying load on the motor. In such cases a voltage control is preferable, but since the smaller motor must be cut out at its highest speed, and the larger motor simultaneously cut in at its lowest speed, the usual methods of voltage control make a quick and smooth transition from one motor to the other difficult to obtain.

My invention consists in deriving from a constant potential source two interdependent voltages respectively, and providing means for varying the two voltages simultaneously but oppositely. Thus, when the voltage for the smaller motor is at its maximum value, the voltage for the larger motor is at its minimum value, so that a smooth transition may be made from one to the other.

More specifically stated, my invention consists in employing a pair of mechanically connected shunt-wound regulating machines connected in series across the supply-circuit and connecting the two driving motors in parallel with the two regulating machines, respectively. By varying the relative field strengths of the two machines, the voltage of the point of connection between the two machines may be varied with respect to either of the supply conductors. With this arrangement by opening the circuit of the high-speed motor, the low-speed motor may be started with a low voltage across its terminals. Then by gradually increasing the field-strength of the regulating machine with which it is connected in parallel, the voltage supplied to the low-speed motor may be gradually raised to its maximum. When this point is reached, the voltage across the other regulating machine will be at its minimum, so that by closing the circuit of the high-speed motor in parallel with the second regulating machine, the high-speed motor is operated at low speed. The low speed motor may be then disconnected from the load and by gradually increasing the relative field-strength of the second regulating machine, the speed and voltage of the high-speed motor may be gradually raised to its maximum. In this manner a smooth transition is obtained from one motor to the other.

My invention further consists in compounding the regulating machines by providing each of these with field winding inserted in series with the motor which is in parallel with that machine. By means of this arrangement, the voltage supplied to each motor in any position of the controller is maintained practically constant, especially at low voltage regardless of variations in the load.

My invention will best be understood with reference to the accompanying drawing, which shows diagrammatically a motor control system arranged in accordance with my invention.

In the drawing, A A' represent the armatures, and B B' the fields of the two regulating machines, which are connected in series between the conductors $a$, $a'$, which are connected to the supply mains $b$, $b'$. The point of connection between the armatures A and A' is connected through the series field winding D and reversing switch E to one terminal of the motor armature F, and is also connected through the field winding D', and reversing switch E to one terminal of the motor armature G. The shunt fields F' and G' of these motors are connected across the conductors $a$, $a'$ in series or parallel.

H represents a driven member which is connected directly to the larger motor F, and through the speed reducing gearing, formed by the gear I and the pinion i, to the smaller motor G. A magnetic clutch J is inserted between the gear I and the driven member.

K represents a regulating resistance by means of which the relative field strengths of the two regulating machines are controlled.

The operation of the system shown is as follows: With reversing switch E in one position or the other, according to the direction of rotation desired, and with the controlling switch C in its first operative position, the armatures and the fields of two regulating machines are connected in series across the supply conductors, and the point of connection between the fields B and B' is connected to a point near the lower end of the resistance K. Nearly all the resistance K is thus included in the shunt to the field B, while the field B' is practically short-circuited. The voltage across the terminals of armature A is consequently nearly equal to the supply voltage, while the voltage across the terminals of A' is low. The motor armature G, which is connected in parallel with the armature A', consequently starts with low voltage. Since the circuit of clutch J is closed by the controlling switch C, the driven member H is driven at a low speed. The circuit of the armature F is open at the controlling switch and therefore this armature runs idly. As the controlling switch is moved into its second position, the circuit connections remain unchanged except that the point of connection between fields B and B' is shifted to a second point on the resistance K, so as to include more resistance in shunt to field B'. The voltage across armature A' is thereby raised while voltage across the armature A is lowered, and the motor G speeds up, increasing the speed at the driven member. In its third, fourth, fifth and sixth positions, the controlling switch still further increases the voltage across the armature A' and consequently the speed of armature G. In the sixth position of the controller, the armature G is receiving nearly the entire voltage of the supply circuit. In passing from the sixth to seventh position of the controller C, the circuit of clutch J is opened, and the circuit of the motor armature F is closed. The motor armature G is thus disconnected from the load, while the motor F drives the load at its lowest speed. By properly proportioning the amount of resistance K in shunt to the field of the two regulating machines, this transition from motor G to motor F may be made very smoothly. As the controller C is moved through its remaining positions, the resistance is gradually cut into the shunt circuit of field B, and out of the shunt circuit of field B', so as to gradually raise the voltage supplied to motor armature F, and consequently to raise the speed of the driven member. The speed of the motor G, which is now running free, is gradually decreased. In moving the controller C from its last position back to its first position, the connections above described are repeated in a reverse order so as to drive the member H at a gradually decreasing speed.

It will be seen that while the motor G is in operation, the field D' is traversed by a current proportional to the load, so that the voltage delivered by the armature A' is automatically maintained approximately constant for any given position of the controller. Similarly the field winding D serves to maintain a constant voltage on armature F for any one position of the controller while the motor F is in operation.

I do not desire to limit myself to the particular construction and arrangement of parts herein shown, but aim in the appended claims to cover all modifications which are within the scope of my invention.

What I claim as new and desire to secure by Letters Patent of the United States, is:

1. In combination with a load to be driven, two electric motors of different capacities, mechanical connections between the load and both motors whereby the load may be driven by either motor but at different speeds, a constant potential supply circuit, means for deriving from said circuit two interdependent voltages for the respective motors, and means for varying said voltages simultaneously but oppositely.

2. In combination with a load to be driven, two electric motors of different capacities, mechanical connections between the load and both motors whereby the load may be driven by either motor but at different speeds, a constant potential supply circuit, means for deriving from said circuit two interdependent voltages for the respective motors, means for varying said voltages simultaneously but oppositely, and means for alternately breaking the circuit of the larger motor and disconnecting the smaller motor from the load.

3. In combination with a load to be driven, two electric motors of different capacities, mechanical connections between the load and both motors whereby the load may be driven by either motor but at different speeds, a constant potential supply circuit, means for deriving from said circuit two interdependent voltages for the respective motors, means for varying said voltages simultaneously but oppositely, a magnetic clutch between the smaller motor and the load, and means for alternately breaking the circuit of the larger motor and of the clutch.

4. In combination with a load to be driven, two electric motors of different capacities, low-speed gearing between the smaller motor and the load, high-speed gearing between the larger motor and the load, a constant potential supply circuit, means for deriving from said circuit two interdependent voltages for the respective motors, and means for varying the said voltages simultaneously but oppositely, said gearing being arranged to give the same load-speed with the smaller motor operating at maximum voltage and with the larger motor operating at minimum voltage.

5. In combination with a load to be driven, two electric motors of different capacities, low-speed gearing between the smaller motor and the load, high-speed gearing between the larger motor and the load, a constant potential supply circuit, means for deriving from said circuit two interdependent voltages for the respective motors, means for varying the said voltages simultaneously but oppositely, said gearing being arranged to give the same load-speed with the smaller motor operating at maximum voltage and with the larger motor operating at minimum voltage, and means for mechanically disconnecting the smaller motor from the load when the larger motor is driving the load.

6. In combination with a load to be driven, two electric motors of different capacities, low-speed gearing between the smaller motor and the load, high-speed gearing between the larger motor and the load, a constant potential supply circuit, means for deriving from said circuit two interdependent voltages for the respectiv motors, means for varying the said voltages simultaneously but oppositely, said gearing being arranged to give the same load-speed with the smaller motor operating at maximum voltage and with the larger motor operating at minimum voltage, and means for alternately breaking the circuit of the larger motor and mechanically disconnecting the smaller motor from the load.

7. In combination with a load to be driven, two electric motors of different capacities, mechanical connections between the load and both motors, whereby the load may be driven by either motor but at different speeds, a constant potential supply circuit, means for deriving from said circuit two independent voltages for the respective motors, means for varying said voltages simultaneously but oppositely, and controlling means for both motors arranged to operate said motors alternately to drive the load.

8. In combination with a load to be driven, two electric motors of different capacities, low-speed gearing between the smaller motor and the load, high-speed gearing between the larger motor and the load, a constant potential supply circuit, means for deriving from said circuit two interdependent voltages for the respective motors, means for varying the said voltages simultaneously but oppositely, said gearing being arranged to give the same load-speed with the smaller motor operating at maximum voltage and with the larger motor operating at minimum voltage, and controlling means for both motors arranged to operate said motors alternately to drive the load.

9. In combination, an electric circuit, a pair of mechanically-connected regulating machines connected in series across said circuit, means for varying the relative field strengths of said machines, two motors connected in parallel with said regulating machines respectively, a load mechanically connected to both motors, and means for controlling the operation of both motors for driving the load.

10. In combination, an electric circuit, a pair of mechanically-connected regulating machines connected in series across said circuit, means for varying the relative field strengths of said machines, two motors connected in parallel with said regulating machines respectively, a load mechanically connected to both motors, and controlling means for both motors arranged to operate said motors alternately to drive the load.

11. In combination, an electric circuit, a pair of mechanically-connected regulating machines connected in series across said circuit, means for varying the relative field strengths of said machines, two motors connected in parallel with said regulating machines respectively, a load to be driven, mechanical connections from said load to said motors whereby said load may be driven by either motor but at different speeds, and controlling means for both motors arranged to operate said motors alternately to drive the load.

12. In combination, an electric circuit, a pair of mechanically-connected regulating machines connected in series across said circuit, means for varying the relative field strengths of said machines, two motors connected in parallel with said regulating machines respectively, a load mechanically connected to both motors, a magnetic clutch between the load and one motor, and a controlling switch arranged to close alternately the circuit of said clutch and the circuit of the other motor.

13. In combination, an electric circuit, a pair of mechanically connected regulating machines connected in series across said circuit, means for varying the relative field strengths of said machines, two motors connected in parallel with said machines respectively, a load to be driven, mechanical connections from the load to said motors whereby said load may be driven by either motor but at different speeds, a magnetic clutch between the load and the low-speed motor, and a switch arranged to close alternately the circuit of said clutch and the circuit of the high-speed motor.

14. In combination, an electric circuit, a pair of mechanically-connected regulating machines connected in series across said circuit, two motors connected in parallel with said machines, respectively, a load to be driven, mechanical connections from the load to said motors whereby said load may be driven by either motor but at different speeds, a magnetic clutch between the load and the low-speed motor, and a controlling switch having its contacts arranged, first, to close the circuit of said clutch and gradually to increase the field strength of the regulating machine in parallel with the low-speed motor relative to the other regulating machine, and then to open the clutch circuit, close the circuit of the high speed motor, and gradually increase the relative field strength of the regulating machine in parallel with the high-speed motor.

15. In combination, an electric circuit, a pair of mechanically-connected shunt-wound regulating machines having their armatures connected in series across said circuit, means for varying the relative strengths of the shunt fields of the machines, a motor connected in parallel with one of said machines, and a field winding for said machine connected in series with said motor.

16. In combination, an electric circuit, a pair of mechanically connected shunt-wound regulating machines having their armatures connected in series across said circuit, means for varying the relative strengths of the shunt fields of said machines, two motors connected in parallel with said machines respectively, a load arranged to be driven by either motor, and field windings for said regulating machines in series with the two motors respectively.

In witness whereof, I have hereunto set my hand this 13th day of October, 1906.

MAXWELL W. DAY.

Witnesses:
　BENJAMIN B. HULL,
　HELEN ORFORD.